(12) United States Patent
Fernandez-Ivern et al.

(10) Patent No.: US 8,127,268 B2
(45) Date of Patent: Feb. 28, 2012

(54) SERVER TESTING FRAMEWORK

(75) Inventors: Javier Fernandez-Ivern, Rocky Hill, CT (US); David Messinger, West Hartford, CT (US); Anthony Ka Wing Yuen, Calgary (CA); Volodymyr Grychyna, Vinnitsa (UA)

(73) Assignee: Topcoder, Inc., Glastonbury, CT (US)

( * ) Notice: Subject to any disclaimer, the term of this patent is extended or adjusted under 35 U.S.C. 154(b) by 1220 days.

(21) Appl. No.: 11/518,531

(22) Filed: Sep. 8, 2006

(65) Prior Publication Data
US 2008/0127093 A1    May 29, 2008

(51) Int. Cl.
    *G06F 9/44* (2006.01)
(52) U.S. Cl. ........ 717/101; 717/120; 717/121; 717/115; 717/126; 717/124
(58) Field of Classification Search ........... 717/124–126
    See application file for complete search history.

(56) References Cited

U.S. PATENT DOCUMENTS

| | | | |
|---|---|---|---|
| 5,754,760 A | 5/1998 | Warfield | |
| 6,002,869 A | 12/1999 | Hinckley | |
| 6,011,830 A | 1/2000 | Sasin et al. | |
| 6,047,389 A | 4/2000 | Thai | |
| 6,167,534 A | 12/2000 | Straathof et al. | |
| 6,182,245 B1 | 1/2001 | Akin et al. | |
| 6,405,364 B1 * | 6/2002 | Bowman-Amuah | 717/101 |
| 6,484,276 B1 * | 11/2002 | Singh et al. | 714/41 |
| 6,543,047 B1 * | 4/2003 | Vrhel et al. | 717/121 |
| 6,701,514 B1 * | 3/2004 | Haswell et al. | 717/115 |
| 6,810,364 B2 | 10/2004 | Conan et al. | |
| 6,959,433 B1 * | 10/2005 | Morales et al. | 717/127 |
| 7,047,446 B1 | 5/2006 | Maurer et al. | |
| 2004/0167749 A1 | 8/2004 | Friedman et al. | |
| 2004/0210866 A1 | 10/2004 | Friedman et al. | |
| 2005/0144593 A1 | 6/2005 | Ragnovir | |
| 2005/0223362 A1 | 10/2005 | Whitlock et al. | |

OTHER PUBLICATIONS

Apache Cactus, "Summary of Changes," downloaded Oct. 16, 2006, http://jakarta.apache.org/cactus/changes.html (pp. 1-10) and http://issues.apache.org/jira/secure/BrowsProject.jspa?id=10471.subset=-1 (pp. 1-5).

Java Developer's Journal, "Using Apache Cactus," Kishore Kumar, Aug. 5, 2004, http://java.sys_con.com/read/45834.htm, downloaded Oct. 16, 2006, pp. 1-10.

Deursen et al., "Refactoring Test Code," in Proceedings of the $2^{nd}$ Int'l. Conference on Extreme Programming and Flexible Processes in Software Engineering (XP2001), M. Marches and G. Succi, ed., May 2001 (9 pages).

(Continued)

*Primary Examiner* — Thomas K Pham
(74) *Attorney, Agent, or Firm* — Goodwin Procter LLP

(57) ABSTRACT

A system and method of developing software includes a configuring a build tool configuration file with instructions to start a server software application, provision the server software application with test data; run unit tests on software that communicates with the server software application using the test data, clean up the test data, and stop the server software application. The build tool may automatically run tasks associated with the configured instructions upon changes to software that interacts with or otherwise depends the server software application.

20 Claims, 13 Drawing Sheets

OTHER PUBLICATIONS

"Mock Object FAQ," archived on archive.org on Nov. 26, 2004, downloaded on Oct. 16, 2006, pp. 1-7 http://web.archive.org/web/20041126020322/http://www.mockobjects.com/Faq.html.

Cactus Architecture: How it works, last update Mar. 26, 2006, downloaded Oct. 16, 2006 http://jakarta.apache.org/cactus/how_it_works.html, pp. 1-5.

Kevin Jones, "Unit Test Java Web Apps with Cactus," Java Pro, Jul. 2003, downloaded on Oct. 16, 2006 http://www.fawcette.com/javapro/2003_07/online/cactus_kjones_07_08_03/default=pf.asp, pp. 1-7.

* cited by examiner

```
// Initialize/startup the servers
Iterator iterator = this.servers.iterator();
while (iterator.hasNext()) {
    ServerElement element = (ServerElement) iterator.next();
    AbstractServer server = element.getServer();
    server.startUp();
    server.initData();
}

// Run the tests
Enumeration tests = getIndividualTests();
// Enumerate all the tests
while (tests.hasMoreElements()){
    // Get individual test
    JUnitTest test = (JUnitTest) tests.nextElement();
    // Check if the test should be executed
    if (test.shouldRun(getProject())) {
        // Set the output directory for the test
        if (this.getToDir() != null) {
            test.setTodir(this.getToDir());
        }
        // Execute the test
        this.execute(test);
    }
}

// Deinitialize/shutdown the servers
iterator = this.server.iterator();
while (iterator.hasNext()) {
    ServerElement element = (ServerElement) iterator.next();
    AbstractServer server = element.getServer();
    server.cleanUpData();
    server.shutDown();
}
```

FIG. 7 – RUN SERVER APP TASK

```
// Retrieve Ant task information
AntTaskInfo taskInfo = this.getAntTaskInfo();
// Create and set ant task factory
container.setAntTaskFactory(
    new DefaultAntTaskFactory(taskInfo.getProject(), task.Info.getTaskName()
        taskInfo.getLocation(),taskInfo.getTarget()));

// Get DeployableFile instance
DeployableFile deployableFile = null;
if (this.getWarFile() != null) {
    deployableFile = WarParser.parse(this.getWarFile());
} else if (this.getEarFile() != null) {
    deployableFile = EarParser.parse(this.getEarFile());
}

// Set deployable file
container.setDeployableFile(deployableFile);

// Calls to setServer(), setPort() and setDir() should be made using reflection,
// but here just simple methods calls are showed.
// Such situation is because they are not part of Container interface,
// but although are present in all containers.
// Exception is GenericContainer, but it should not be supported.
// Set server address
container.setServer(this.getServer());
// Set server port
container.setPort(this.getPort());
// Set server installation directory
container.setDir(this.getDir());
// Init the container
container.init();
// Set timeout
runner.setTimeout(this.timeout);

// Set URL to test connection with
if (this.getTestURL() != null) {
    runner.setURL(this.getTestURL());
} else {
    URL url = new URL(container.getBaseURL() + "/"
        + deployableFile.getTestContext()
        + deployableFile.getServletRedirectorMapping()
        + "?Cactus_Service=RUN_TEST");
    runner.setURL(url);
}

// Start the container (starts server if server wasn't already running)
runner.startUpContainer();
```

FIG. 8
STARTING SERVLET CONTAINER EXAMPLE

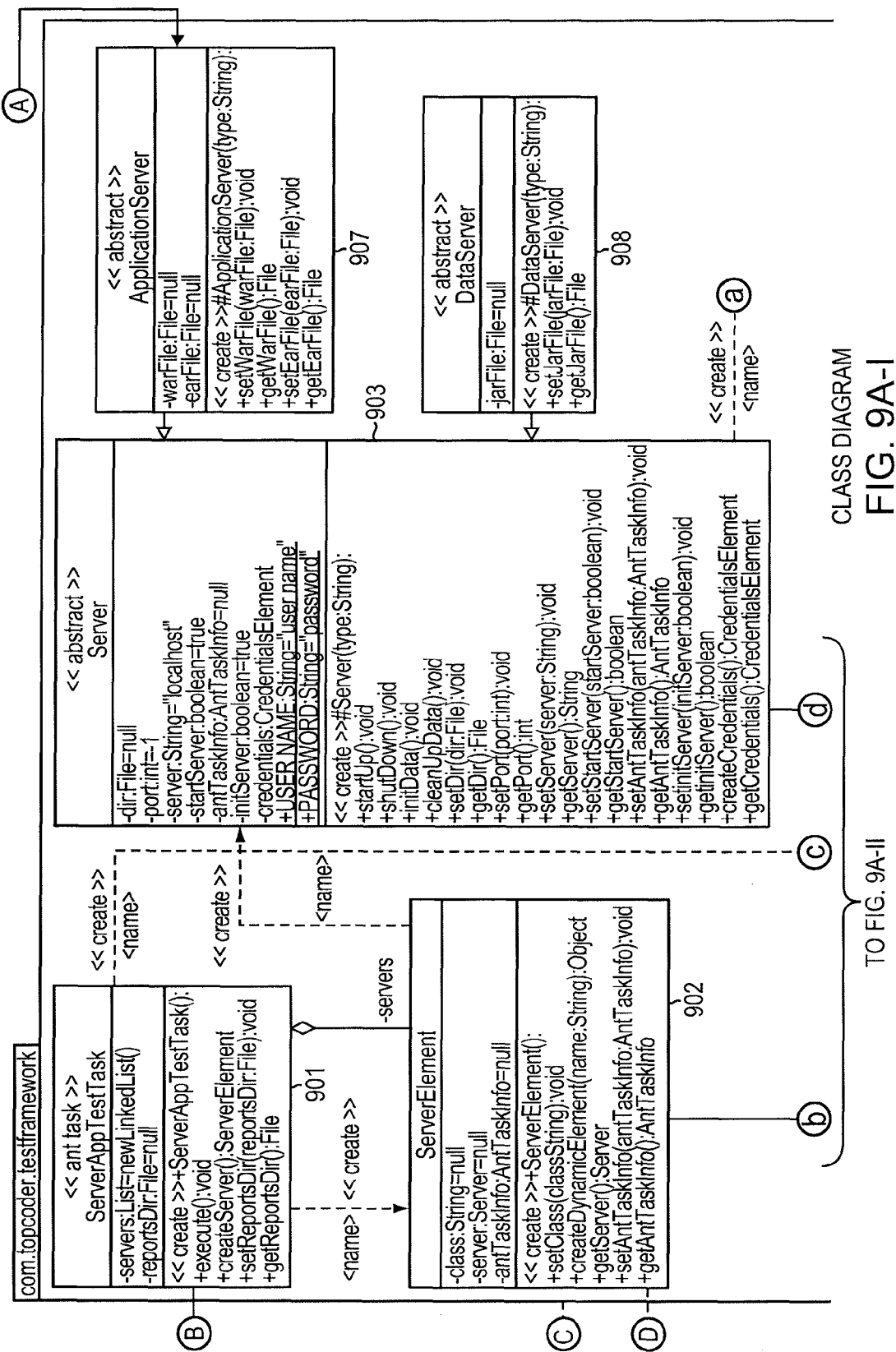
FIG. 9A-I
CLASS DIAGRAM

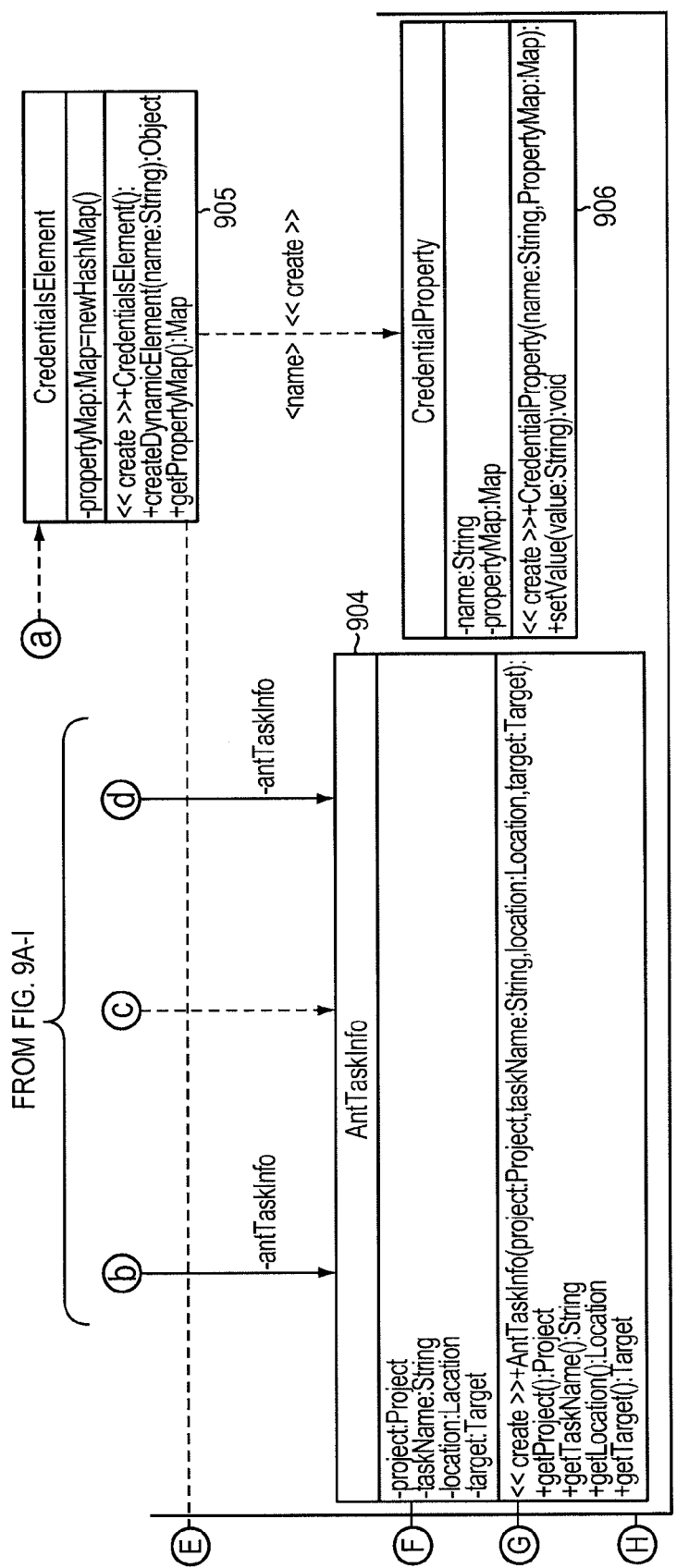
FIG. 9A-II
CLASS DIAGRAM

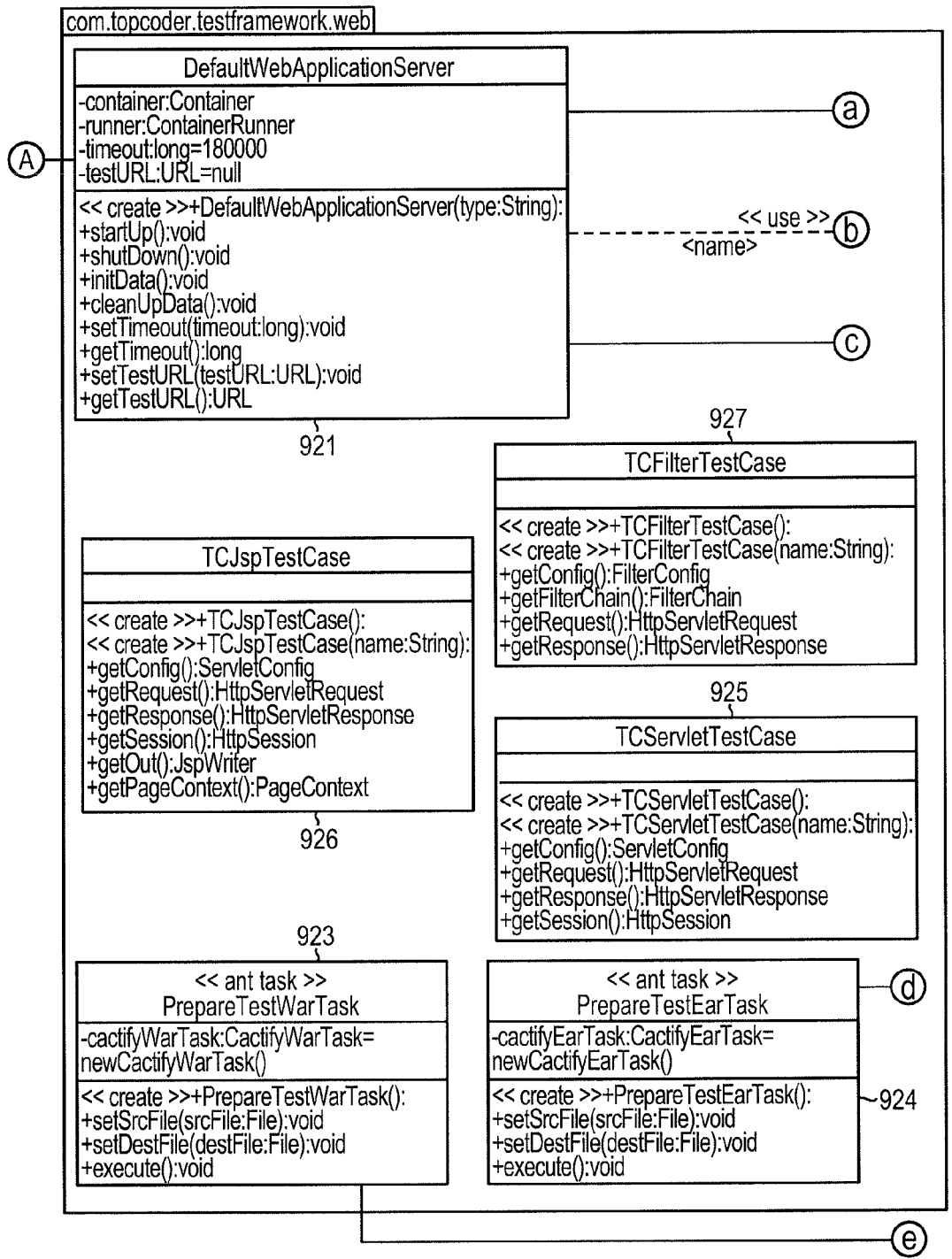
FIG. 9B-I

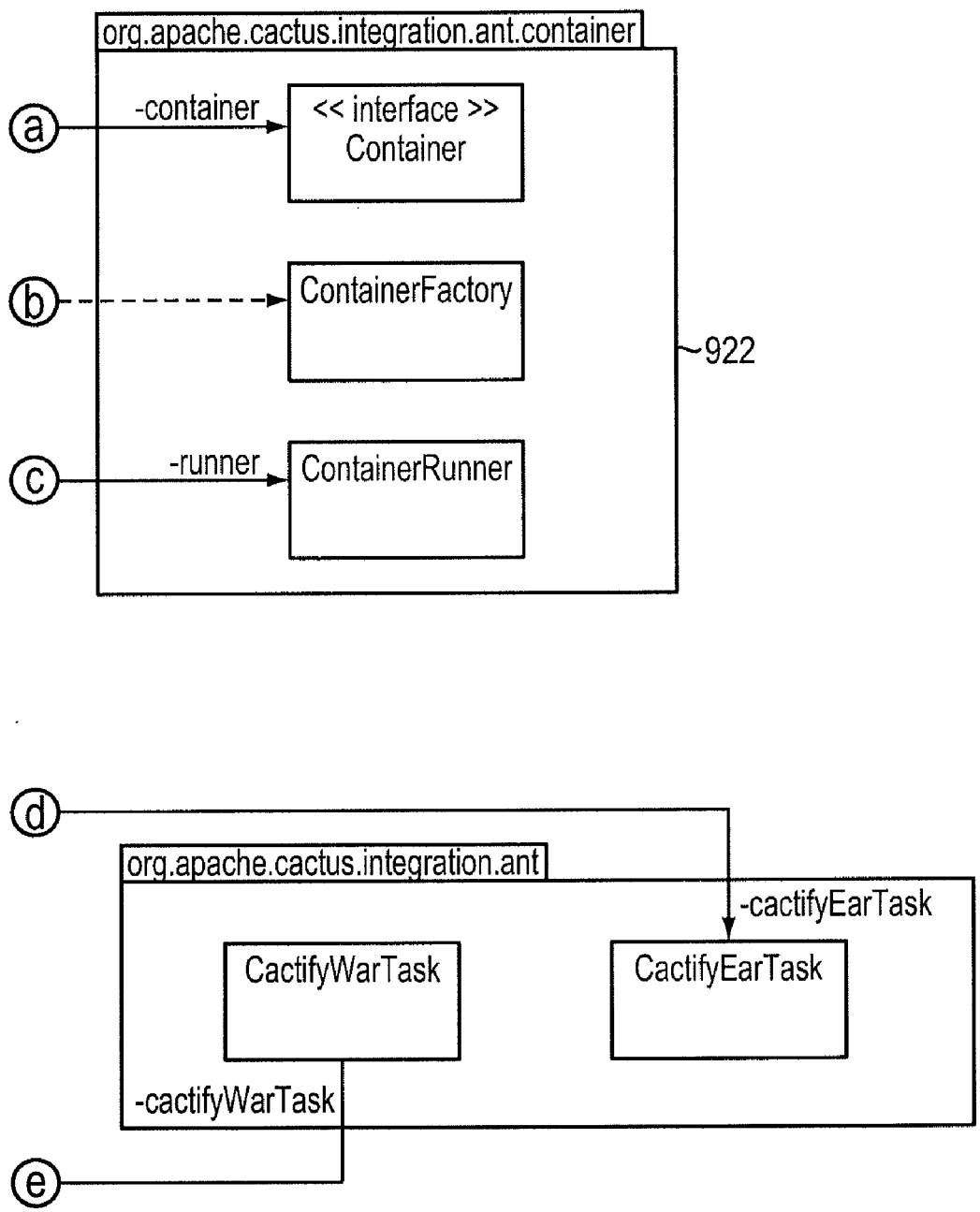
FIG. 9B-II

SERVER TESTING FRAMEWORK

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING APPENDIX

This application includes an Appendix of a computer program listing on one compact disc (and one duplicate), that is hereby incorporated by reference, in the file named "Testing-Framework_dotNet.txt" created on Jun. 21, 2006, and of size 245 KB and the file named "TestingFramework_Java.txt, created on Jun. 21, 2006 and of size 300 KB.

BACKGROUND

Unit testing, discussed, for example, in the context of computer software development methodologies such as extreme programming ("XP"), has become a commonly-used technique. Developers write and maintain automated tests coded in the same programming language as production code. These tests typically are considered to be part of the code, and are included in revision control. The tests verify functionality, and also serve to document code by explicitly describing exemplary use of the functionality and expected results. Tests may be added or expanded upon to check for bugs and verify bug fixes. A typical unit test for a method may include code to set up the data used for testing (sometimes referred to as a fixture), a call of the method under test with the test data, a comparison of actual results with expected values, and tear down of the test data. Testing may be supported by testing frameworks, such as JUnit for JAVA, and NUnit for .Net, for example, which provide functionality to accomplish these tasks.

Some XP proponents suggest running tests on code every time it is changed. For example, a build tool may be configured to compile a file into a jar (in the case of Java code, for example) and then automatically run unit tests on the compiled code.

For example, the Ant build tool, available from the Apache Software Foundation, is platform independent, and is intended to be configured with a configuration file written in XML. The Ant configuration file describes a tree of targets, each target including one or more tasks that may be executed. For example, a task may be to create a directory (e.g., "mkdir"), perform a Java compile (e.g., "javac") and so on. Ant includes a number of built-in tasks, and also is extensible. One task that may be performed with Ant is to execute tests within the JUnit testing framework. The build tool thus can be configured to automatically run unit tests on code that has changed.

In the context of complex web applications, it can be difficult to test code that is dependent on external server software applications. Examples of such server software applications are web servers (e.g., Apache Tomcat, Microsoft Internet Information Server) and database servers (e.g., MySQL database, Oracle 7, PostgreSQL). Test code that makes optimistic assumptions about the presence or state of any external resources can cause non-deterministic behavior in test outcomes. This is even more true if the test code relies on the presence or state of a particular server. While it may be possible in some cases to perform some simple tasks (e.g., create a directory, copy a database table) in the context of a testing framework or conventional build tools, it is frequently the case that it is not practical to administer and configure a server software application. As such, it may be difficult to automate such testing.

Jakarta Cactus, from the Apache Software Foundation, for example, provides extensions to the JUnit testing framework for servlets, which may be Java code that runs as a service. Cactus is intended to allow testing of the servlet by creating a mechanism to set up and tear down the servlet so that unit tests may be run on the servlet. Although beneficial for developing servlets, Cactus does not address starting or configuring a server software application that the servlet depends on.

One solution to this problem is the development of a "mock object" to test the behavior of other objects. A mock object may act as a faux implementation of an interface or class that mimics the external behavior of a true implementation. See http://www.mockobjects.com. Although mock objects may be helpful, it can be difficult to construct a mock object that sufficiently simulates the external behavior of a server software application to act as a useful substitute for testing.

SUMMARY

Embodiments of the present invention address the problem of conducting unit tests on software that depends on external server software applications by extending and configuring a build tool to start and configure one or more server software applications prior to conducting unit tests, and to clean up and shut down the server software applications after the unit tests. In this way, the unit tests can be conducted on software that depends on server software applications that includes interaction with the actual servers using realistic test data. This enables automated more thorough testing, with resulting efficiency and quality benefits.

While Cactus, for example, may provide functionality to start a servlet for testing the servlet code itself, it does not provide a generalized mechanism for setting up or tearing down servers software applications that may be required for testing of a servlet, or for code that interfaces with a servlet or more generally, directly or indirectly, with a server software application, as part of a unit test.

In general, in one aspect, a method of developing software, includes configuring a build configuration file for a build tool, the build tool configuration including instructions, the instructions including starting a server software application, configuring the server software application with test data, running unit tests on software that depends on the server software application provisioned with the test data, cleaning up the test data, and stopping the server software application. The method also may include automatically running by the build tool the configured instructions upon the initiation of a build operation following changes to software that depends on the server software application.

The build tool may be any suitable build tool. In one embodiment, the build tool is Ant. In another embodiment, the build tool is NAnt. The software may be any sort of software. In one embodiment, the software is written in Java. In another embodiment, the software is written in C#. Likewise, the server software application may be any server software application. For example, in various embodiments, the server software application may be a web server, ftp server, application server, database server, servlet, or any other sort of server application software.

In various embodiments, the unit tests may be any sort of tests that are used to test the software under test. In various embodiments, software that interfaces with the server software application is under test, and not the server software application itself. In such embodiments, it is not the intention of the unit tests to test the server application software, but rather to test the software that interfaces directly or indirectly with the server software application. It is in this circumstance, that the applicability of certain test and configuration data for the server software application may be helpful for conducting the unit tests. For example, if the software under test is a servlet or software that interfaces with a servlet, a container for the servlet (e.g., and applications server, database server, and so on) may be provisioned to enable such testing, with appropriate data and configuration.

In general, in another aspect, a system for developing software includes a computer readable medium including a build configuration file. The build configuration file includes instructions for a build tool to start a server software application, configure the server software application with test data, run unit tests on software that depends on the server software application using the test data, clean up the test data, and stop the server software application. The system also includes a build tool for running the configured tasks upon changes to the software that communicates with the server software application.

The computer readable medium may be any sort of computer readable medium, as non-limiting examples, a hard drive, ROM, RAM, a portable memory drive, a floppy disk, and so on.

In various embodiments, multiple servers may be started, configured, cleaned up after, and stopped to enable one or more unit tests.

In general, in one aspect, a method of developing software includes specifying two or more server software applications and test data associated with each of the server software applications to be used in testing software that communicates with the server software applications. A build tool automatically starts each of the plurality of server software applications and provisions them with respective test data. The build tool runs unit tests on software that depends on at least some of the server software applications. The build tool cleans up the respective test data and stops each of the plurality of server software applications.

Again, in various embodiments the two or more server software applications each may be any sort or type of server software application, including without limitation web server, servlet, ftp server, application server, or database server. For example, one server software application may be a web server, and another of the server software applications may be a database server. As another example, there may be two web servers and an application server. It should be understood that there may be any number of server software applications, and some may be the same, or all may be different, and they may be configurable in a variety of ways.

Provisioning a server application may depend on the server application software, but may include creating and/or placing content in directories, providing web pages and/or scripts, database data (e.g., tables), web application data, and the like. Provisioning also may include setting state data for the server application software by configuring data that is part of the server application software. Configuring also may include providing other test data for software that works with the server application software. Provisioning may include saving a current state prior to configuring a new state. Provisioning may include temporarily halting the activity of the server application software during the configuration.

Cleaning up the test data may include deleting files, directories, and/or configuration data. Cleaning up the test data may include restoring the server application software to a state that it was in prior to a test.

Starting and stopping the server application software each may include sending a command or a message to the server application software and/or executing operating system, application server, and/or other commands or instructions to start and stop the server. Starting the server application software, may also include, for example, establishing a connection to the server application software and/or authenticating to the server application software.

In some embodiments, the server application software may be configured before it is started, and/or the server application software may be stopped before clean up. In other embodiments, the order of one or both may be reversed or otherwise.

BRIEF DESCRIPTION OF THE DRAWINGS

FIG. 7 depicts exemplary code fragments for an embodiment of the invention, demonstrating steps to initialize/start the server application software, run tests, and clean up and shut down server application software.

FIG. 8 depicts exemplary code fragments for an embodiment of the invention, showing starting of a servlet.

FIGS. 9A, 9B, and 9C depict and exemplary class diagram for an embodiment of the invention.

DETAILED DESCRIPTION

Figure 1:
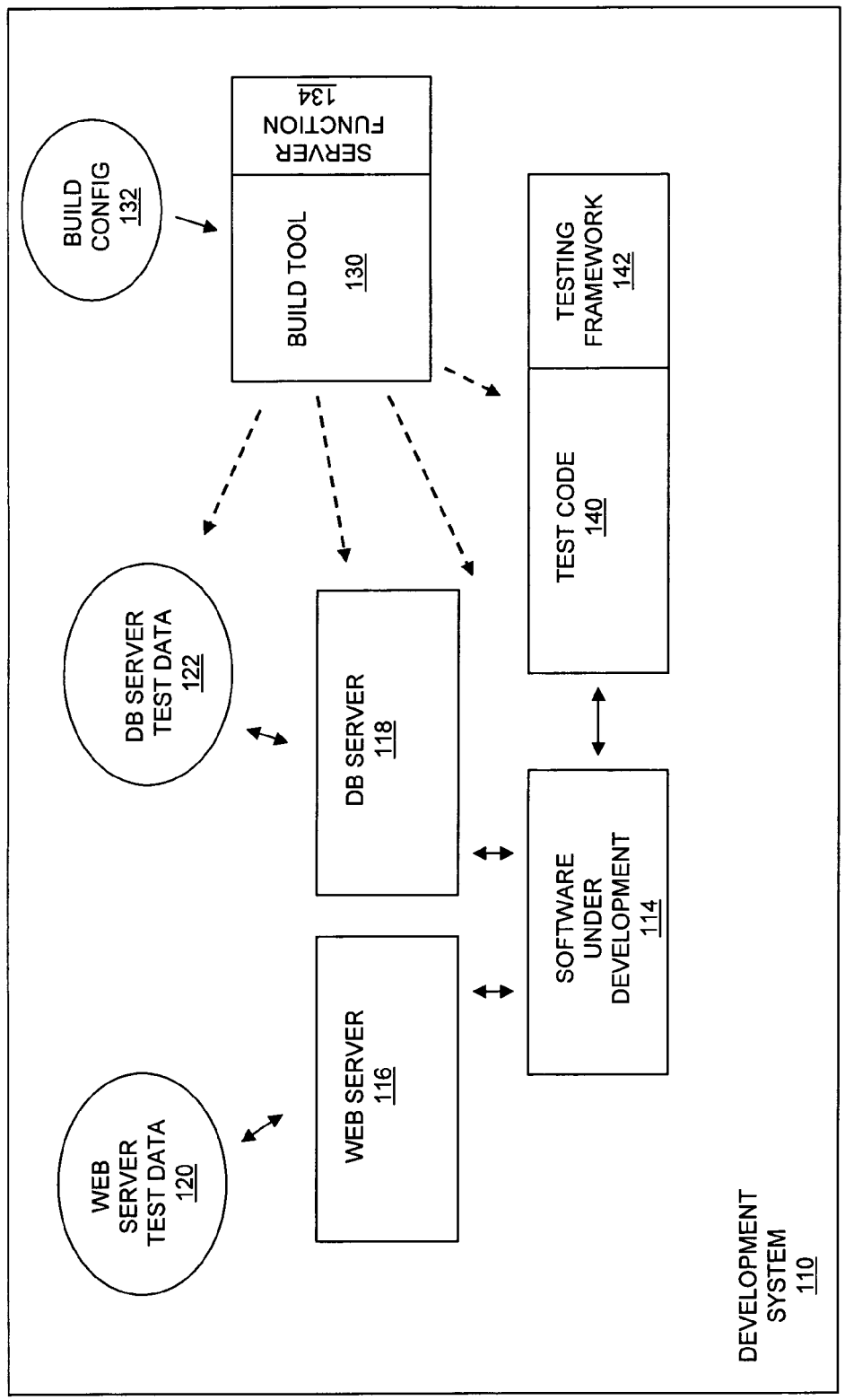
FIG. 1 is a block diagram of a system according to an embodiment of the invention.

Referring to FIG. 1, in one embodiment, a development system 110 is used to develop software 114. The software under development 114 may be a portion of a computer software application, for example, a method, class, component, and so on, or may be a complete program. In this example, the software under development depends on one or more server software applications 116, 118. Although two server software applications 116, 118 are shown in the figure, it should be understood that there may be one, two, three, or any number of server software applications.

In this example, the software under development 114 interacts, directly or indirectly, with the server software applications 116, 118. For example, the software under development 114 may be a web-based application that receives web page requests via a web server 116, and stores data in a database, by communicating via a Java Database Connectivity (JDBC) connector to a database server 118. This is just one of many possible examples, however, and it should be understood that the software under development 114 may communicate directly or indirectly in any manner with the server application software. Just as another non-limiting example, the software under development 114 may use a persistence engine to interact with the database server 118.

The server software applications 116, 118 each are provisioned with respective test data 120, 122 that may be used in testing the software under development 114. The test data may be any sort of configuration and/or information that is used to configure or enable the operation of the server software applications 116, 118.

For example, the web server test data 120 may include one or more directories with web content in the form of files containing HTML code, CGI code, and so on. The test data may include configuration files for the web server 116, log files for the web server 116, and so on. Likewise, the database server test data 122 may include database table configuration information, database table data, and so on. The database server test data 122 may include configuration files for the database server 118, log files for the database server 118, transactions processed by the database server 118, and so on.

It should be understood that provisioning a server software application with test data may depend on the server application software, but may include creating and/or placing content in directories, providing files, databases, documents, and/or scripts, setting state data, and so on. Provisioning may include saving a current state prior to configuring a new state. Provisioning may include temporarily halting the activity of the server application software during provisioning.

The development system 110 is preferably implemented on one or more server class computers that have sufficient memory, data storage, and processing power and that run a server class operating system (e.g., SUN Solaris, GNU/Linux, and the MICROSOFT WINDOWS family of operating systems).

In one exemplary implementation, server software applications include an off-the-shelf web server software application (e.g., Apache) 116, database server software application 118 (e.g., MySQL, Oracle 7), application server software application (e.g., JBoss, Websphere) (not shown), FTP server software application, file server software application, and so on. Other types of system hardware and software than that described herein may also be used, depending on the capacity of the device and the number of users and the size of the user base. For example, the server application software 116, 118 may be or may be part of a logical group of one or more servers such as a server farm or server network. As another example, there could be multiple servers that may be associated or connected with each other, or multiple servers could operate independently, but with shared data. In a further embodiment and as is typical in large-scale systems, server application software could be implemented in components, with different components running on different server computers, on the same server, or some combination.

The development system 110 includes a software build tool 130. The build tool 130 may be a build tool such as make, gnumake, nmake, and jam, Ant, or NAnt. In a preferred embodiment, the build tool is Ant, available from the Apache Software Foundation for use with Java technology, or NAnt for use with the .Net platform, or similar tool, which may be configured with XML-based configuration files and extended with object-oriented classes (e.g., Java or C# code).

The build tool may be configured, through use of a build configuration 132 to build the software under development. Typically, the build configuration includes targets and instructions to perform tasks based on the condition of the targets. For example, if a source code file has been modified, a compile task may be performed. As another example, following a compile, creation of a new Java Archive File (JAR) may be performed. Some build tools, such as Ant, include instructions to execute unit tests as part of a build. If implemented, this feature allows a developer to run tests on the code automatically, when the software is built, or at a later time.

In this exemplary embodiment, the build tool 130 includes a server function 134 that is used to enable the server functionality of the build tool 130. Specifically, in one embodiment, the server functionality 134 enables the build tool to start server application software, stop server application software, to configure test data for the server application software, and to clean up test data for the server application software. The server function 134 may be an extension, additional configuration and/or code that may be added to the build tool 130, or the server function 134 may come with or be included in the build tool. The server function 134 may be configured as a pluggable interface to allow for the incorporation and configuration of various server software applications.

In one embodiment, the server function 134 provides tasks to enable tests defined in the framework to be driven by the build tool 130. These tasks contain the configuration necessary to perform their functions. The tasks are serverapptest, preparetestwar, and preparetestear. These are described further below.

In one embodiment, an element representing a server in a build file has two boolean attributes for controlling server initialization. These attributes are "startserver" and "initserver." The "startserver" attribute specifies whether the server should be started by the framework. The "initserver" attribute specifies whether the server should be initialized by data within the framework.

The development system 110 also includes test code 140 for testing the software under development 114. The test code 140 may include unit tests that test the software under development 114 and its interaction with one or more of the server software applications. The test code 140 may include tests that test interaction of the software under development with two or more server software applications within the same test. Preferably, the test code 140 has been designed to work within a testing framework 145. The testing framework 145 provides a framework for conducting tests. In one embodiment, the testing framework is Junit. In another embodiment, the testing framework is NUnit. Other suitable frameworks also may be used.

In this example, the build tool 130 includes tasks that call tests within the test code 140 to test the software under development. In one embodiment, the build tool is configured with the configuration file to perform the tasks of starting a server software application, configuring the server software application with test data, running unit tests on software that depends on the server software application using the test data, cleaning up the test data, and stopping the server software application. In one such embodiment, these tasks are performed automatically by the build tool upon changes to the software under development 114.

In one embodiment, the tasks are performed iteratively for each of two, three, four, or more server software applications in the configuration. Thus, the build tool is configured with the configuration file to perform the tasks of iteratively starting each of a plurality of server software applications, iteratively configuring each of the plurality of server software applications with test data, running unit tests on software that depends on the server software applications, iteratively cleaning up the test data for each of the plurality of server software applications, and iteratively stopping each of the plurality of server software applications. In one such embodiment, these tasks are performed automatically by the build tool upon changes to the software under development 114.

Thus, in one embodiment, a system for developing software may include a build configuration 132 and a server function 134 within a build tool 130. The build configuration 132 includes instructions for a build tool to start a server software application, configure the server software application with test data, run unit tests on software that depends on the server software application using the test data, clean up the test data, and stop the server software application. When initiated, the build tool may run the configured tasks upon changes to the software under development 114 that communicates with the server software application. Again, for multiple server software applications, the tasks may be performed iteratively for each server software application of a plurality of server software applications. The configuration and the build tool may be provided on a computer readable medium, with instructions for implementing the functions described here. The software used to implement the system may include modules and submodules to perform the various tasks described.

As a demonstrative example of an embodiment, an exemplary servlet may be represented by the code shown in TABLE 1. The exemplary servlet may not be a fully functional servlet, but may be suitable for testing. This servlet imports a servlet from javax.servlet, which is available from Sun Microsystems of Mountain View, Calif.

TABLE 1

EXAMPLE SERVLET

```
// Sample servlet to be tested SampleServlet.java
//
import javax.servlet.http.HttpServlet;
import javax.servlet.http.HttpServletRequest;
public class SampleServlet extends HttpServlet
{
    public void saveToSession(HttpServletRequest request)
    {
    String testparam = request.getParameter("testparam");
    request.getSession( ).setAttribute("testAttribute", testparam);
    }
    public void doGet(HttpServletRequest request, HttpServletResponse
    response)
    {
    saveToSession(request);
    // Forward the request to JSP, assume that this JSP just renders dummy
    HTML
    request.getSession( ).getServletContext( ).getRequestDispatcher("/
    test.jsp").forward(request, response);
    }
}
```

For this demonstrative example, an exemplary unit test may be provided such as shown in TABLE 2. The exemplary unit test is implemented using the JUnit framework.

TABLE 2

EXAMPLE UNIT TEST

```
///////////////////////////////////////////
// Sample unit test TestSampleServlet.java
import junit.framework.Test;
import junit.framework.TestSuite;
import com.topcoder.testframework.TCServletTestCase;
public class TestSampleServlet extends TCServletTestCase
{
    public TestSampleServlet(String theName)
    {
    super(theName);
    }
    public static Test suite( )
    {
    return new TestSuite(TestSampleServlet.class);
    }
    public void beginDoGetOK(WebRequest webRequest)
```

TABLE 2-continued

EXAMPLE UNIT TEST

```
    {
    webRequest.addParameter("testparam", "it works!");
    }
    public void testDoGetOK( )
    {
    SampleServlet servlet = new SampleServlet( );
    servlet.doGet(this.getRequest( ), this.getResponse( ));
    assertEquals("it works!",
    this.getSession( ).getAttribute("testAttribute"));
    }
}
```

For this example servlet and for this example unit test, an exemplary build configuration file may include one or more exemplary code fragments such as shown in TABLE 3. It should be noted that the build configuration may also contain definitions of targets, compiling of the application under test, and so on. These fragments demonstrate the operations that may be used to start, provision, and stop server application software upon which the exemplary servlet depends.

The code fragments shown in TABLE 3 include the definition of Ant tasks "serverapptest," "preparetestwar," and "preparetestear." The fragment for "preparetestwar" prepares an existing web application archive for testing, for example for testing the servlet. The fragment "serverapptest" starts the servers, runs the tests and then stops the servers. Included in this fragment are two "server" fragments that provide further definitions for a web application server and a database server, as well as "fileset" file settings for the test. The exemplary build configuration demonstrates the starting, configuration, and stopping of servers that provide an operating environment for the exemplary servlet.

TABLE 3

EXEMPLARY BUILD CONFIGURATION FILE FRAGMENTS

```
<!-- Define the Ant tasks-->
<taskdef name="serverapptest"
classname="com.topcoder.testframework.ServerAppTestTask"/>
<taskdef name="preparetestwar"
classname="com.topcoder.testframework.PrepareTestWarTask"/>
<taskdef name="preparetestear"
classname="com.topcoder.testframework.PrepareTestEarTask"/>
<!-- Prepare existing web-application archive for testing-->
<preparetestwar srcfile="${target.dir}/${project.name.file}.war"
destfile="${test.dir}/test.war">
</preparetestwar>
<!-- This Ant task starts the servers, runs the tests, and then stops the
servers -->
<serverapptest printsummary="yes" failureproperty="tests.failed"
todir="${test.reports.dir}">
<classpath>
<path refid="serverapptest.classpath"/>
<pathelement location="${build.classes.dir}"/>
<pathelement location="${test.classes.dir}"/>
</classpath>
<!-- This element describes the application server using Cactus back-end
and Tomcat 5.5 server-->
<!-- By default the server is started and initialized with data>
<!-- Cactus implementation ignores "initserver" and "startserver"
attributes anyway-->
<server class="DefaultWebApplicationServer">
<tomcat5x warfile="${test.dir}/test.war"
dir="${tomcat5x.home}" port="8080">
</tomcat5x>
</server>
<!-- This element describes the database server (It's not provided by this
component)-->
<!-- The server is not started but is initialized with data-->
    <server class="SomeDataBaseServer" startserver="no"
```

TABLE 3-continued

EXEMPLARY BUILD CONFIGURATION FILE FRAGMENTS

```
initsever="yes">
    <postgresql jarfile="${test.dir}/db_test_data.jar"
    dir="${postrgresql.home}" port="some_port_number">
        <credentials>
            <user_name value="topcoder" />
            <password value="some_password" />
            <some_other_property="some_value"/>
        </credentials>
    </postgresql>
</server>
<formatter type="xml"/>
<batchtest>
    <fileset dir="${src.test.dir}">
        <include name="**/Test*.java"/>
        <exclude name="**/TestAll.java"/>
    </fileset>
</batchtest>
</serverapptest>
```

Figure 2:
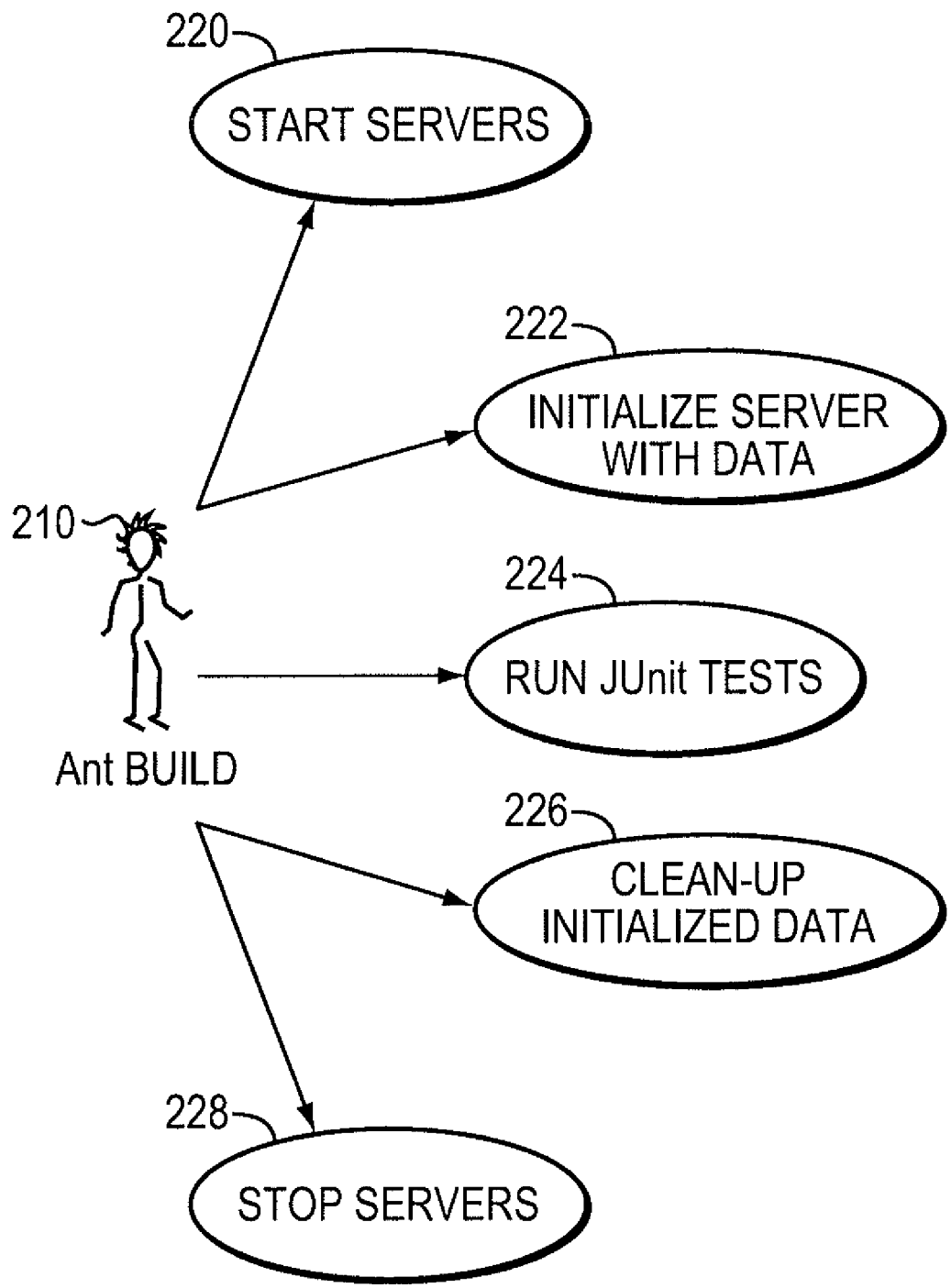
FIG. 2 is a use case diagram showing use cases in an embodiment of the invention.

Referring to FIG. 2, a use case diagram for an embodiment of the invention shows the Ant build tool 210 as an actor. The build tool may be a build tool configured as described above. The use cases that may be effected by the build tool 210 include starting servers 220, initializing the server with data 222, running test suites 224, cleaning up test data 226, and stopping the server 226.

With respect to starting servers 220, this may include executing the commands for starting a server, if necessary. The commands needed may be determined by the type of server.

With respect to server initialization 222, this may include provisioning the server with test data. For a SQL database server, this may mean starting the database server, creating the necessary tables, and possibly filling the tables with test data. For a Tomcat (JSP) server, this would mean deploying the web application and starting the Tomcat server. In one embodiment, it is possible to initialize several servers for one testing task.

With respect to running test suites 224, in one embodiment, the tests may be run using the JUnit testing framework.

With respect to cleaning up test data 226, the test data may be removed, if desired. This may involve saving some data from the test for further analysis. This may involve deleting file system elements and/or directories, and restoring configurations, as appropriate.

With respect to stopping servers 226, this may include executing the commands for stopping a server, if necessary. The commands needed may be determined by the type of server.

Figure 3:
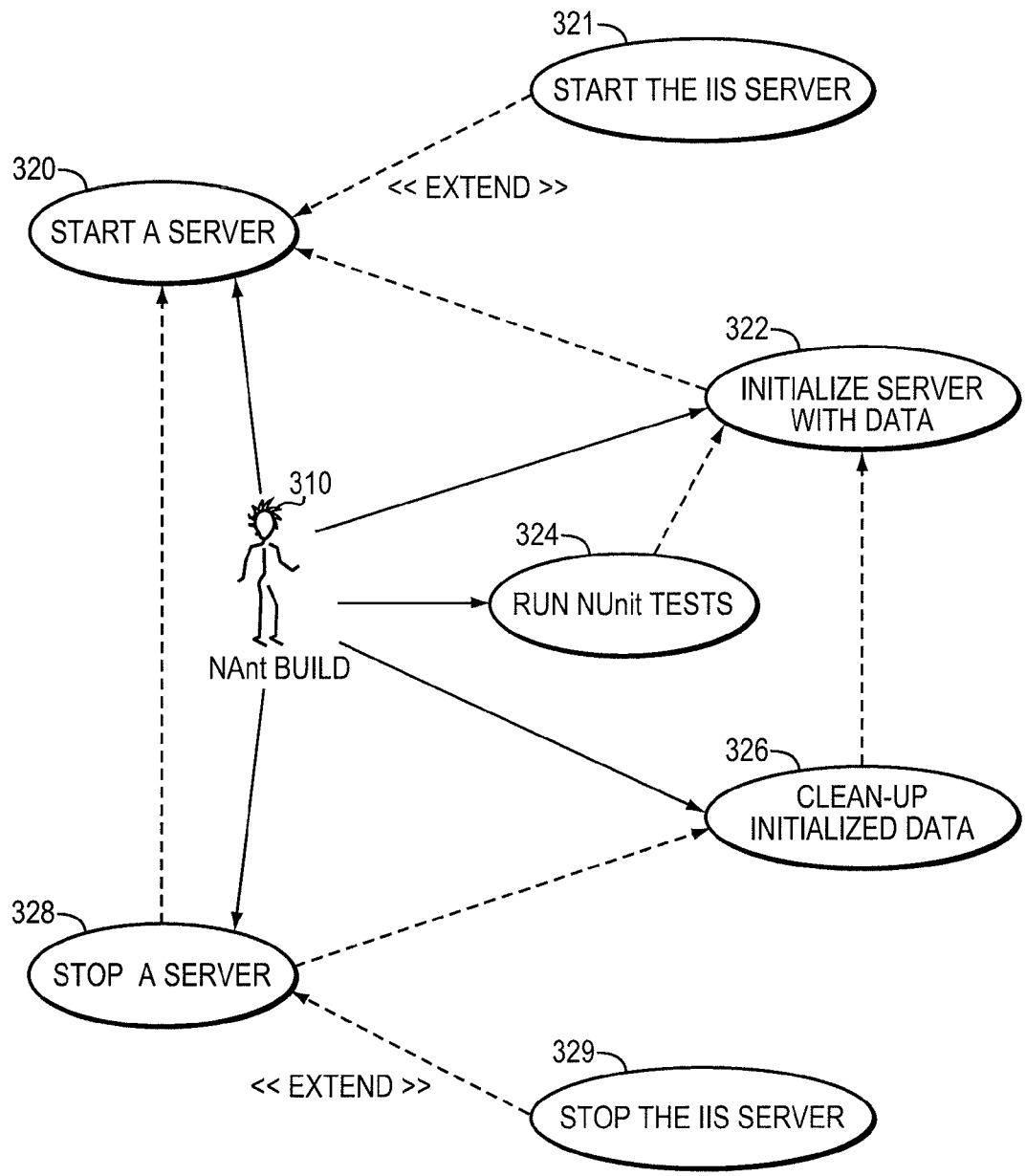
FIG. 3 is another use case diagram showing use cases in another embodiment of the invention.

Referring to FIG. 3, another use case diagram for another embodiment of the invention shows the NAnt build tool 310 as an actor. The build tool 310 may be a build tool as configured as described above. The use cases that may be implemented by the build tool 310 include starting servers 320, which includes starting an IIS server 321. Additional use cases that may be implemented by the build tool 310 include initializing the server with data 322, running test suites 324, cleaning up test data 326, and stopping the server 326, which includes stopping an IIS server 329. This use case diagram depicts dependency with dotted lines.

Figure 4:
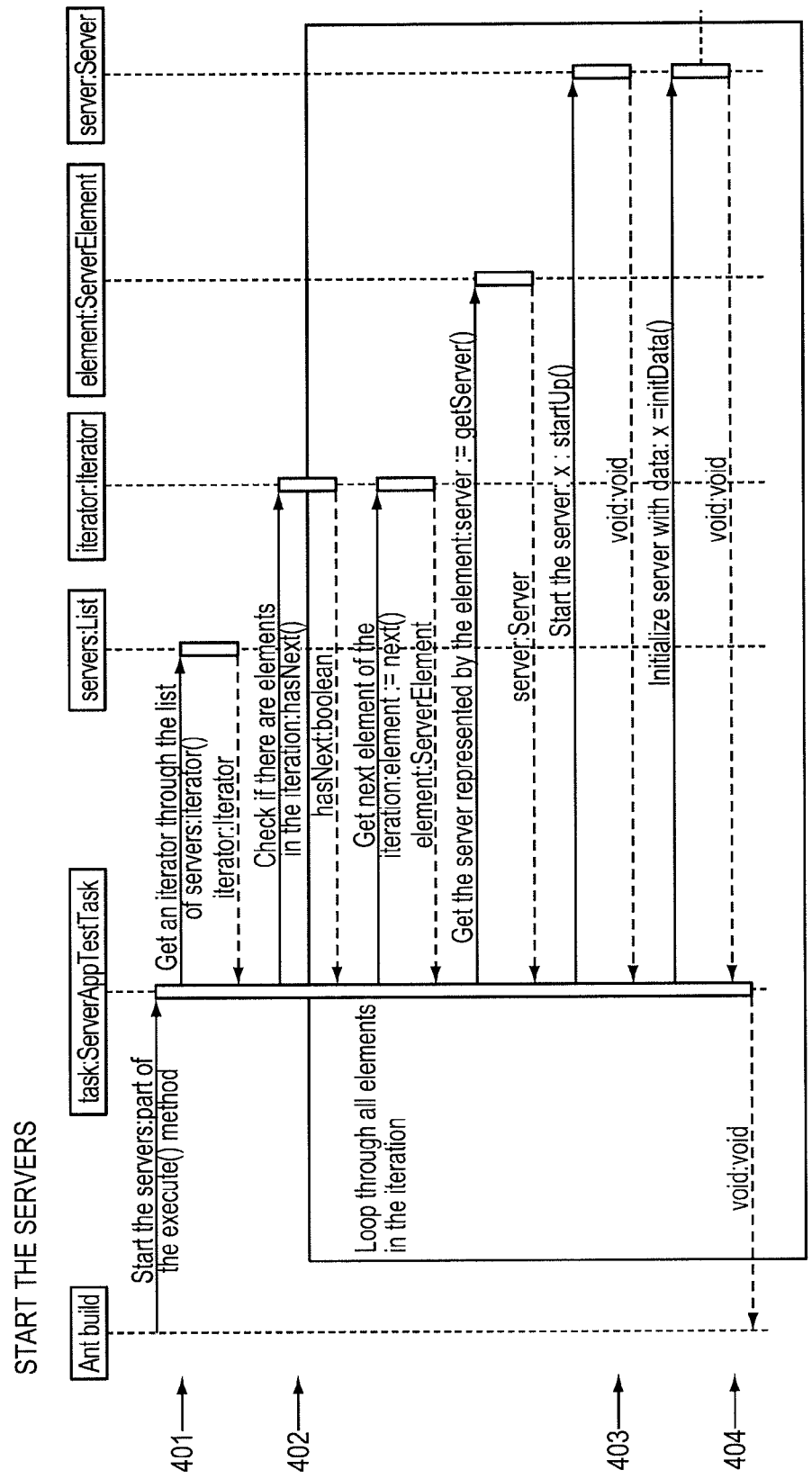
FIG. 4 is a sequence diagram depicting starting servers in an embodiment of the invention.

Referring to FIG. 4, a sequence diagram for an embodiment of the invention of FIG. 2 shows a sequence of steps to taken when starting servers. The sequence includes identifying a list of servers 401, and iterating through the list of servers 402, one server at a time. For each server, the sequence includes starting the server 403, and initializing the server with test data 404. This is shown in pseudocode in Table 1.

Figure 5:
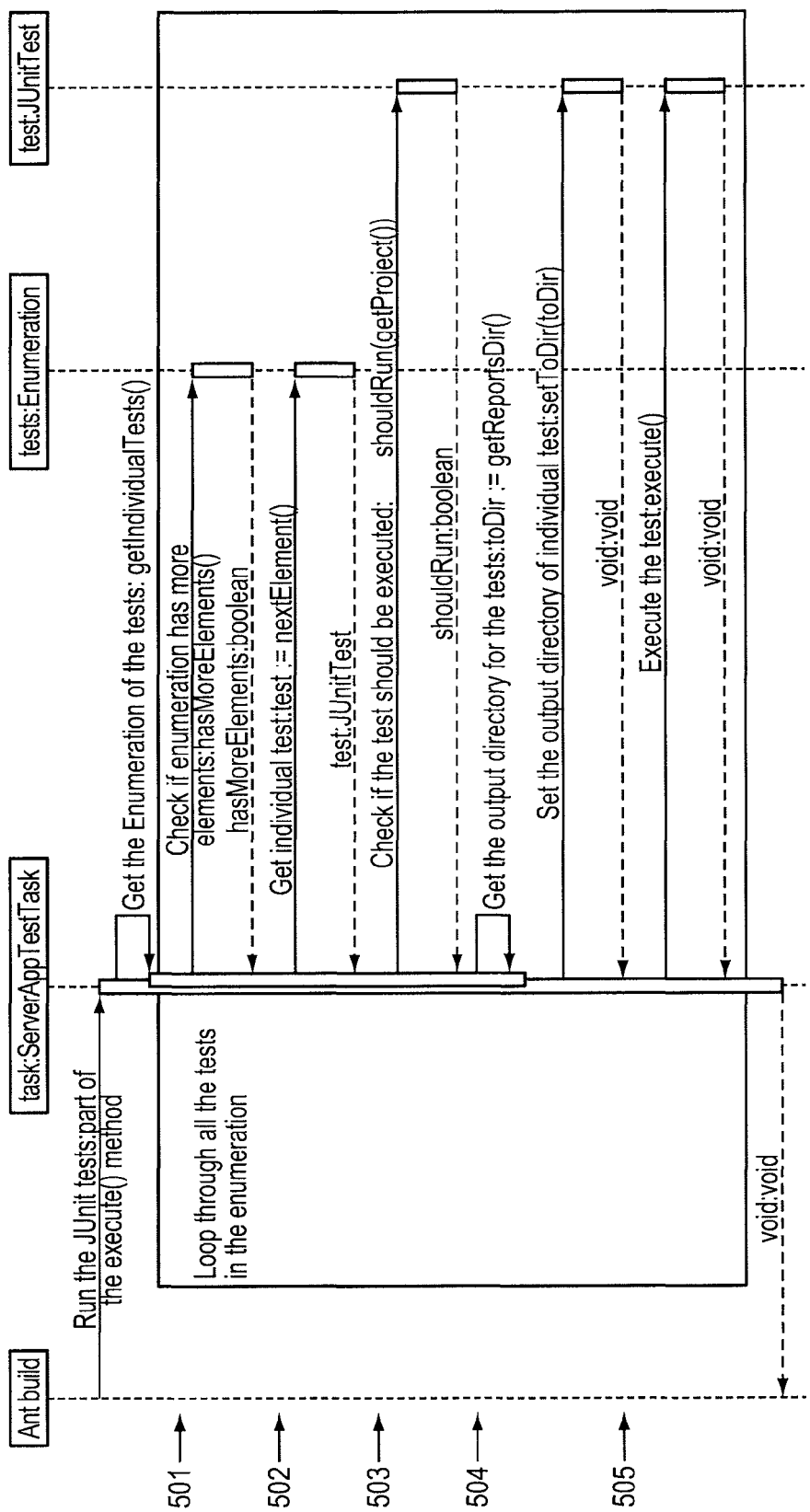
FIG. 5 is a sequence diagram depicting running unit tests in an embodiment of the invention.

Referring to FIG. 5, a sequence diagram for an embodiment of the invention shows a sequence of steps to be taken when running the tests. This involves determining the number of tests 501, and for each test 502, getting the individual test, checking to see if the test should be executed 503, getting and setting the output directory for the test (if necessary) 504, and executing the test 505.

Figure 6:
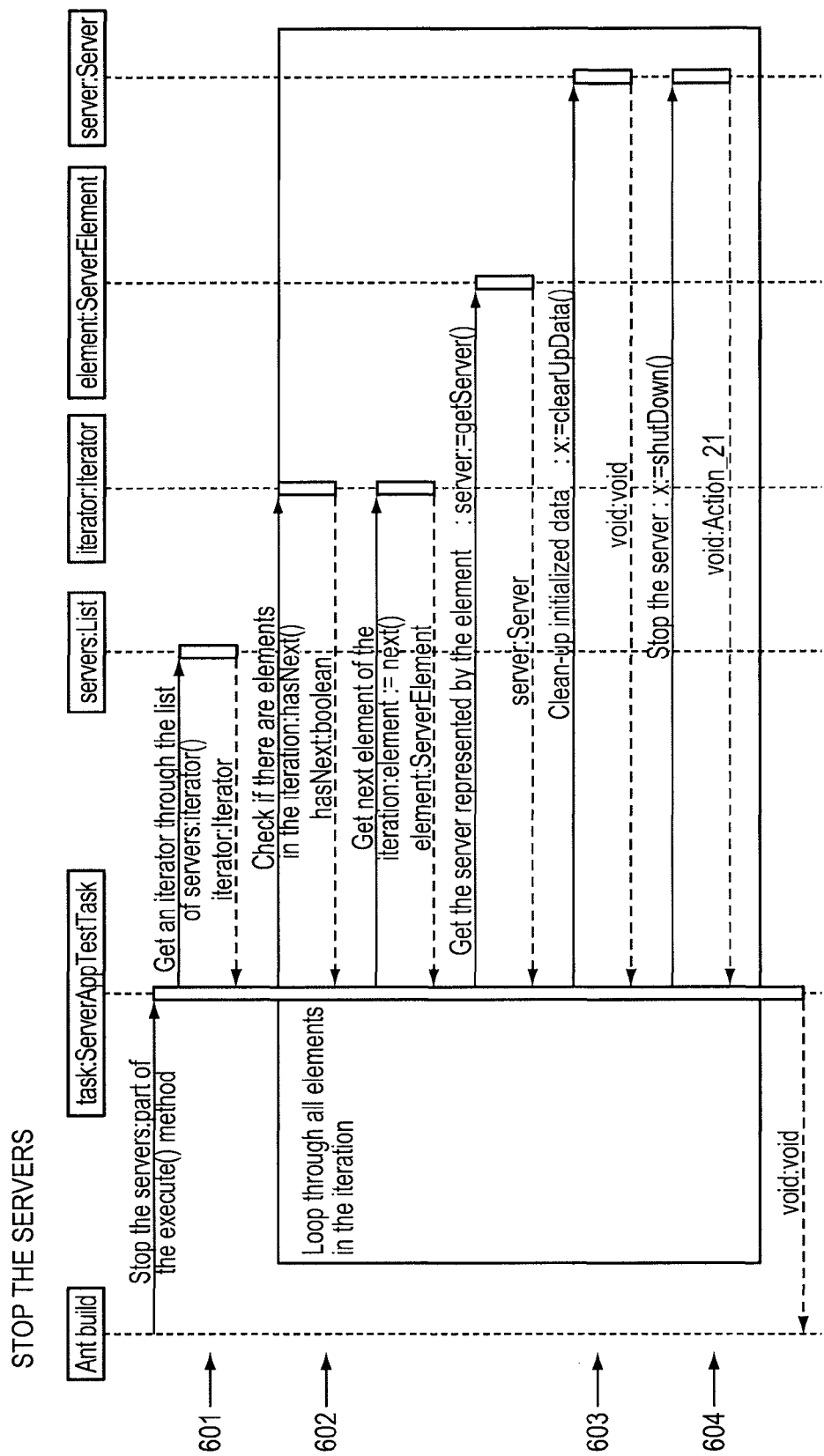
FIG. 6 is a sequence diagram depicting stopping servers in an embodiment of the invention.

Referring to FIG. 6, a sequence diagram for an embodiment of the invention shows a sequence of steps to taken when stopping the servers. The sequence includes identifying a list of servers 601, and iterating through the list of servers 602, one server at a time. For each server, the sequence includes cleaning up the test data 603, and stopping the server 604.

Referring to FIG. 7, exemplary code fragments for an embodiment of the invention are shown to demonstrate steps used to initialize/start one or more servers, run the tests, and clean up and shut down the servers. This code or similar code may be included, for example, in an Ant task.

Referring to FIG. 8, more specific information is provided to show starting of a servlet container using the interface using the Cactus servlet interface. Again, this is demonstrative, and it should be understood that by providing the system described herein, the build tool will be able to start, configure, run tests on, clean up after, and stop server application software in addition to servlets. It also should be understood, that in addition to the functionality provided in Cactus for working with the servlet, the code shown enables starting, configuration, and shutdown of containers for such a servlet, thereby allowing for testing of code that might interface with or otherwise depend on a servlet (or even the servlet code itself), even if the container was not previously operational or appropriately configured.

The exemplary software code in the Appendix on CD-ROM provides implementations of exemplary embodiments of the invention. The Appendix includes a file "TestingFramework_dotNet.txt" created on Jun. 21, 2006, and of size 245 kilobytes, which is a listing of the source code files and test cases for an exemplary implementation for the Net/NUnit/NAnt architecture. The Appendix also includes a file named "TestingFramework_Java.txt, created on Jun. 21, 2006 and of size 300 kilobytes, which is a listing of the source code files and test cases for an exemplary implementation for Java/JUnit/Ant architecture.

Figure 9C:
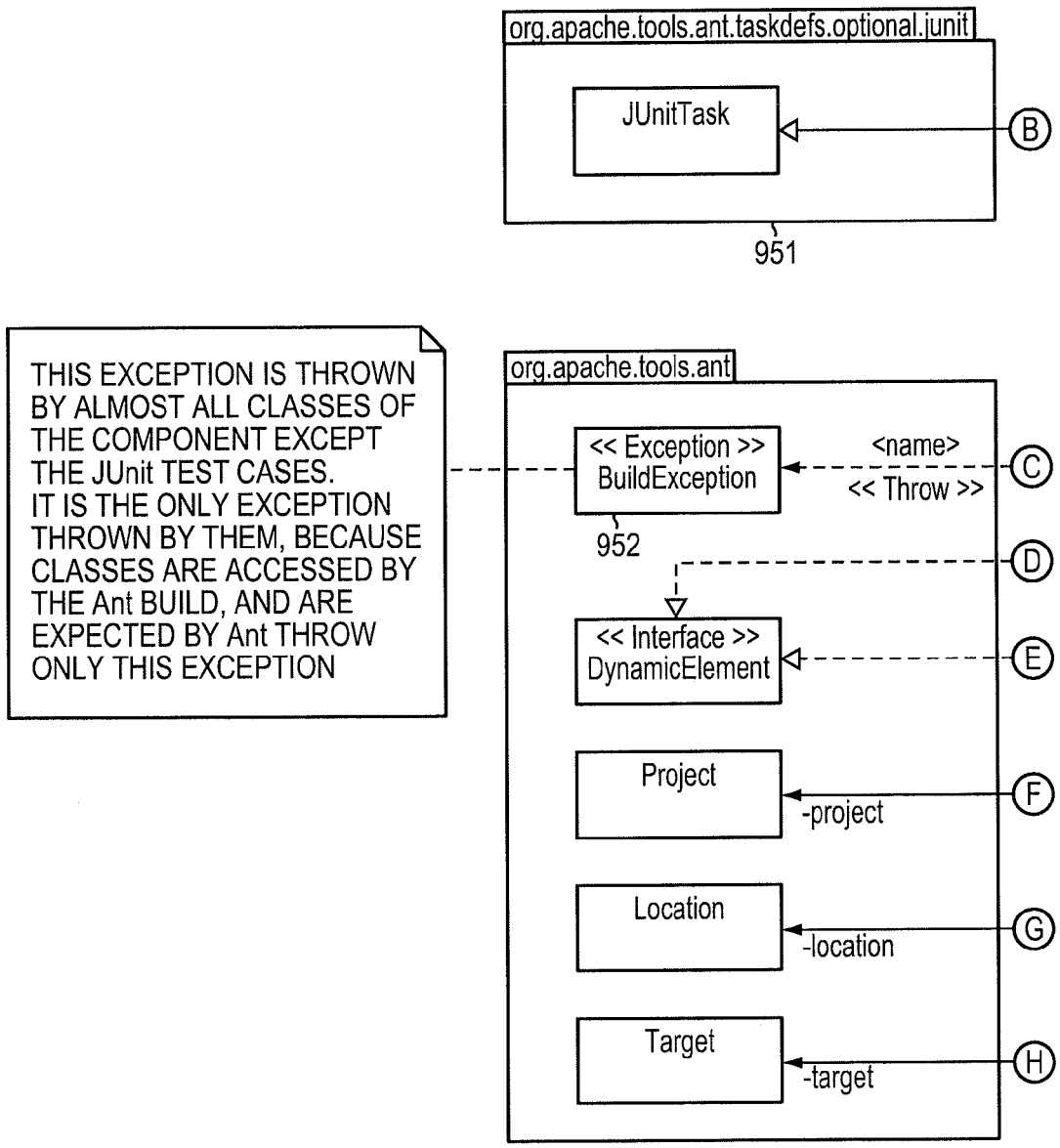

Referring to FIG. 9A-9C, a class diagram depicts classes in some embodiments of the invention. These classes shown in the class diagram are an example of an implementation. In general, these classes are used in the example code in the appendix, although the class diagram is as shown for an exemplary Java implementation. This exemplary implementation, like the exemplary Java code in the Appendix, is implemented using JUnit and Ant. Implementations using .Net may be similar, with some of the differences mentioned below.

Referring to FIG. 9A, the class ServerAppTestTask 901 may represent an Ant task that extends the optional JunitTask 951 (FIG. 9C) to provide support for testing. ServerAppTestTask 901 may be the main Ant task for the framework. As shown in the figure, ServerAppTestTask 901 includes attributes such as a list of servers (serversList), and a directory for reports (reportsDir). Operations may include creating an instance and accessing the attributes. In the .Net implementation, the class derives from NUnit2 task, and is the main "worker" NAnt task.

The class ServerElement 902 represents a "Server" XML element to be used in the Ant build file. ServerElement 902 is derived from AntTaskInfo 904 (described below). ServerElement 902 depends on the Server class 903. It acts as a container for an element representing the actual server to be used for running tests. Attributes include the class, the server, and antTaskInfo attributes. Operations include creating an instance of a ServerElement, getting and setting attributes. In the .Net implementation, this class is derived from the Element class. This class represents a "server" XML element to be used in the NAnt build file. This element may be used inside the "serverapptest" NAnt task, which is represented by the ServerAppTestTask class.

The class Server 903 may be a base class for classes representing a server that is used while running tests. In some implementations, derived classes may have corresponding XML elements in an Ant build file. As shown, the Server class includes attributes such as the name of the server (server.String), whether the server is started (startServer), antTaskInfo attributes, whether the initialization of the server, credentials (described below), and a username/password. Operations provided by Server include starting (startUp( )) and shutting down (shutDown( )) the server, initializing the data (initData( )), cleaning up the data (cleanUpData( )) and getting and setting attributes. In a .Net implementation, for example, this class may store attributes passed from the ServerElement class, and appropriate file properties are provided for accessing the attributes.

The class AntTaskInfo 904 may store data about the Ant project. It may be passed, for example, with current data to the ServerElement class instance 902 and then to Server 903 derived classes instances. It may be used, for example, to provide information to a Cactus implementation, but may be used for other tasks as well. As shown, the AntTaskInfo class includes such attributes as the project (project), the task name (taskName), the location (location), and the target (target). It includes operations to create a task and get these attributes.

The class CredentialsElement 903 may represent a credentials XML element to be used in an Ant build file. Credentials may include user name, password, and other authentication information or data needed to authenticate to a server. A particular Server 903 implementation may require specific credentials. This element may be thought of as a property map in which each property is described by one nested property element, for example as provided by the CredentialProperty class.

In a Java implementation, the class CredentialProperty 906 represents a property from the property map. The name (name) represents the property key, the value attribute (e.g., propertyMap) contains the property value.

The class ApplicationServer 907 is derived from the Server class 903 and is the base class for all classes representing an application server to be used while running tests. For example, instances of this class may have corresponding elements in an Ant build file that includes configuration information for such an ApplicationServer. In addition to the Server 903 class attributes and operations, the ApplicationServer 907 class includes attributes warFile and earFile, and operations to create, get, and set those attributes.

The class DataServer 908 also is derived from Server 903 class, and is the base class for all classes representing data server to be used while running tests. For example, in a Java implementation, those classes may have corresponding elements in an Ant build file that includes configuration information for such a DataServer. As shown, in addition to the attributes inherited from the Server class 903, this class 908 includes a JAR (Java archive) file as an attribute, and operations to create, get and set that information. For example, this class may be a base for another component that may provide testing ability for database servers. TestCase classes also may be provided.

Referring now to FIG. 9B, the class DefaultWebApplicationServer 921 is derived from the ApplicationServer 907 class. The class may represent a web application server to be used while running tests. For example, in some implementations, it may use Cactus as a back-end, and through Cactus to support servlets that are supported by Cactus. The attributes of the Default WebApplicationServer, for example, may include a container attribute and a runner attribute, which are derived from the container and runner in the Cactus integration ant container 922, and the name of the corresponding XML element in the Ant build file may be the same as the Cactus container type representing the desired server. In the .Net implementation, for example, it supports the Microsoft IIS server, and in various implementations may support any or almost any service-based server.

The class PrepareTestWarTask 923 may represent an Ant task that injects elements necessary to run tests into a WAR file. The operations may be used to prepare WAR format files for DefaultWebApplicationServer class.

The class PrepareTestEarTask 924 may represent an Ant task that injects elements necessary to run the tests into an EAR file. It may be used to prepare EAR format files for DefaultWebApplicationServer class.

The class TCServletTestCase 925 may represent a JUnit test case that may be used to unit test code that accesses Servlet implicit objects (such as an HTTP request, an HTTP response, servlet configuration, and so on). In some implementations, the class may derived from Cactus ServletTestCase, and add more high level access to Servlet objects. Servlet objects may be accessed by the derived classes using the operations provided by this class.

The class TCJspTestCase 926 may represent a JUnit test case that may be used to unit test code that accesses JSP implicit objects (such as the page context, the output jsp writer, the HTTP request, and so on). In some implementations, the class may be derived from Cactus JspTestCase, and add more high level access to JSP objects. JSP objects may be accessed by the derived classes using the operations provided by this class.

The class TCFilterTestCase 927 may represent a JUnit test case that may be used to unit test code that needs an access to valid Filter implicit objects (such as Filter Config and FilterChain objects). In some implementations, the class may be derived from Cactus FilterTestCase, and add further high level access to Filter objects. Filter objects may be accessed by the derived classes using the operations provided by this class.

Referring to FIG. 9C, the following Exceptions may be used:

The exception BuildException 952 may be thrown by all the classes that are to be used from the Ant build. In some implementations, of the classes described, only the JUnit test may not throw it.

The Throwable exception (not shown) may be thrown by JUnit test cases. It means that every exception is just passed by JUnit test cases directly to the JUnit test runner 922 (FIG. 9B).

In the .Net implementation, the following Exceptions may be used:

Exception ServerException—This exception is derived from ApplicationException. This exception is thrown by the classes derived from Server class, for example, when an error takes place during processing. It also may be thrown by the ServerElement class, when that class fails to create a corresponding class derived from Server.

Exception ServerTaskException—This exception is derived from BuildException. It is thrown by the ServerAppTestTask, for example, when exceptions are caught when executing a task.

What is claimed:

1. A method of developing software, comprising:
configuring a build configuration for a build tool, the build configuration comprising instructions for:
starting a server software application to be used by software under test;
provisioning the server software application with test data to be used by the server software application during unit tests of the software under test;
running unit tests on the software under test that depends on the server software application provisioned with the test data;
cleaning up the test data; and
stopping the server software application; and
automatically running, by the build tool, the configured build configuration instructions upon initiation of a build following changes to the software that depends on the server software application.

2. The method of claim 1, wherein the sever software application is a web server.

3. The method of claim 2, wherein the web server is the Apache Tomcat web server.

4. The method of claim 2, wherein provisioning the server software application comprises configuring the web server with directory and access configuration information.

5. The method of claim 4, wherein provisioning the server software application further comprises providing web pages to be served by the web server.

6. The method of claim 5, wherein provisioning the server software application further comprises configuring a state of the web server.

7. The method of claim 1, wherein the server software application is a database server.

8. The method of claim 7, wherein provisioning the server software application comprises provisioning the database server with directory and access configuration information.

9. The method of claim 8, wherein provisioning the server software application further comprises provisioning a database.

10. The method of claim 9, wherein provisioning the server software application further comprises configuring the state of the database server.

11. The method of claim 1, wherein cleaning up the test data comprises deleting test data from a directory.

12. The method of claim 1, wherein cleaning up the test data comprises deleting server configuration information.

13. A system for developing software, comprising:
a computer readable medium comprising a build configuration file, the build configuration file comprising instructions being executable by a build tool to: (i) start a server software application to be used by software under test, (ii) provision the server software application with test data to be used by the server software application during unit tests of the software under test, (iii) run unit tests on software that depends on the server software application provisioned with the test data, (iv) clean up the test data, and (v) stop the server software application; and
a build tool for running the build configuration file instructions upon changes to the software that communicates with the server software application.

14. A method of developing software, comprising:
specifying a plurality of server software applications and test data associated with each of the plurality of server software applications to be used in testing software that depends on the server software applications;
automatically, by a build tool:
starting each of the plurality of server software applications to be used by software under test, each being configured with respective test data to be used by the server software applications during unit tests of the software under test;
running unit tests on software that depends on the server software applications; and
cleaning up the respective test data and stopping each of the plurality of server software applications.

15. The method of claim 14 wherein one of the plurality of server software applications is a web server, and another of the plurality of server software applications is a database server.

16. The method of claim 14 wherein one of the plurality of server software applications is a web server, and another of the plurality of server software applications is a file server.

17. The method of claim 14 wherein one of the plurality of server software applications is a web server, and another of the plurality of server software applications is an application server.

18. The method of claim 14, wherein cleaning up the respective test data comprises deleting test data.

19. The method of claim 14, wherein stopping one of the servers comprises issuing a command to the server.

20. The method of claim 14, wherein for at least one of the plurality of server software applications, the server software application is stopped before test data is cleaned up.

* * * * *